US006801788B1

(12) United States Patent
Csapo et al.

(10) Patent No.: US 6,801,788 B1
(45) Date of Patent: *Oct. 5, 2004

(54) DISTRIBUTED ARCHITECTURE FOR A BASE STATION TRANSCEIVER SUBSYSTEM HAVING A RADIO UNIT THAT IS REMOTELY PROGRAMMABLE

(75) Inventors: John S. Csapo, Dallas, TX (US); Mitchell Johnson, McKinney, TX (US); Bruce F. Brady, Benbrook, TX (US); Mark C. Chien, Plano, TX (US); Robert A. Rapp, Carrollton, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/379,551

(22) Filed: Aug. 23, 1999

Related U.S. Application Data

(63) Continuation-in-part of application No. 09/149,168, filed on Sep. 8, 1998.
(60) Provisional application No. 60/058,228, filed on Sep. 9, 1997.

(51) Int. Cl.[7] ................................................ H04B 1/38
(52) U.S. Cl. ..................... 455/561; 455/550.1; 455/500
(58) Field of Search ............................... 455/562, 561, 455/550, 349, 347, 90, 272, 500, 550.1; 343/702; 370/248, 249; 375/267, 347

(56) References Cited

U.S. PATENT DOCUMENTS

| | | | | | |
|---|---|---|---|---|---|
| 4,607,389 A | * | 8/1986 | Halgrimson | .................. | 455/11 |
| 4,694,484 A | * | 9/1987 | Atkinson et al. | ........... | 455/349 |
| 5,528,691 A | * | 6/1996 | Rosauer et al. | ............... | 380/21 |
| 5,548,813 A | * | 8/1996 | Charas et al. | .............. | 455/33.1 |
| 5,557,603 A | * | 9/1996 | Barlett et al. | ............... | 370/267 |
| 5,572,201 A | * | 11/1996 | Graham et al. | ................ | 455/45 |
| 5,628,052 A | * | 5/1997 | DeSantis et al. | ......... | 455/562.1 |
| 5,768,685 A | * | 6/1998 | Patel et al. | .................. | 455/137 |
| 5,805,983 A | * | 9/1998 | Naidu et al. | ............. | 455/67.16 |
| 5,887,255 A | * | 3/1999 | Jackson et al. | ............. | 455/561 |
| 5,970,410 A | * | 10/1999 | Carney et al. | .............. | 455/446 |
| 6,058,317 A | * | 5/2000 | Posti | .......................... | 455/561 |
| 6,223,056 B1 | * | 4/2001 | Appel | ......................... | 455/561 |
| 6,269,255 B1 | * | 7/2001 | Waylett | ...................... | 455/562 |

FOREIGN PATENT DOCUMENTS

| | | | |
|---|---|---|---|
| EP | 0 684 707 | 11/1995 | |
| EP | 0 593 822 | 11/1996 | |
| GB | 2 281 009 | 2/1995 | |
| GB | 2281009 | * 2/1995 | ............ H04Q/7/26 |
| GB | 2 328 581 | 2/1999 | |
| GB | 2 329 798 | 3/1999 | |
| WO | WO 96/01013 | 1/1996 | |
| WO | WO 97/02715 | 1/1997 | |
| WO | WO 97/41704 | 11/1997 | |
| WO | WO 98/39851 | 9/1998 | |
| WO | WO 99/17572 | 4/1999 | |

* cited by examiner

Primary Examiner—Tilahun Gesesse

(57) ABSTRACT

A telecommunication base station transceiver subsystem that can be easily configured to provide single or multi-carrier frequency service. The base station is divided into a main unit and a radio unit such that the radio unit is positioned proximate to the antennas and the main unit is remotely located from the radio unit. A single base station transceiver can provide service via multiple wireless protocols, such as CDMA, TDMA, GSM or Analog. The base station transceiver can also operate on various transmit/receive frequencies as well as variable transmit power settings. Furthermore, the base station transceiver can be reprogrammed, reconfigured and/or statused by a network operations center.

22 Claims, 14 Drawing Sheets

OMNI, SINGLE FREQUENCY
WITH DIVERSITY ANTENNAS

OMNI, DUAL FREQUENCY
WITH ANTENNA SHARING

OMNI, THREE CARRIER WITH ANTENNA-SHARING
ON THREE FREQUENCIES

THREE-SECTOR, SINGLE FREQUENCY
WITH NO ANTENNA SHARING

OMNI, MULTI-CARRIER WITH ANTENNA-SHARING
ON PAIRS OR FREQUENCIES

DISTRIBUTED ARCHITECTURE FOR A BASE STATION TRANSCEIVER SUBSYSTEM HAVING A RADIO UNIT THAT IS REMOTELY PROGRAMMABLE

CROSS REFERENCE TO RELATED APPLICATIONS

This application, is a continuation-in-part of 09/149,168, filed Sep. 8, 1998, which claims the benefit of U.S. Provisional Application No. 60/058,228, filed Sep. 9, 1997.

BACKGROUND OF THE INVENTION

1. Field of the Invention

The present invention generally relates to wireless communication systems and, more particularly, to base station transceiver subsystems used in a Code Division Multiple Access (CDMA) network or other digital and analog telecommunication systems.

2. Description of Related Art

FIG. 1 (prior art) is a block-flow diagram which graphically represents a wireless communication system. From FIG. 1 it is seen that a basic wireless communication system comprises a mobile station 10, a base station 20, a reverse link 30, which represents the electromagnetic wave communication link transmitted from mobile station 10 to base station 20, and a forward link 40 which represents the electromagnetic wave communication link transmitted from base station 20 to mobile station 10.

FIG. 2 (prior art) shows a cell grid and cell sites. In a wireless communication system based on the general cellular principle, a service area 49 is divided geographically, into a number of small areas 50, 52, 54, 56 called "cells." In each cell there is a cell site 58, 60, 62, 64 where radio equipment known as a Base Station Transceiver Subsystem (BTS) is installed. Multiple cell layouts such as macro cells, micro cells, and Pico cells can be provided within a particular geographical area to effect hierarchical coverage (where macro cells provide the largest coverage and Pico cells the smallest). Pico cells may be used to provide coverage,inside buildings, to cover a special area (campus, stadium, airport and shopping mall), to temporarily cover for special events or areas hit by natural disasters, to cover outlying remote locations, to supplement macro or mini cells with hole-filling, or to enhance the capacity of hot spots. FIG. 3 (prior art) is a block diagram of a wireless system network connected to a land line Public Switched Telephone Network (PSTN) 68. As shown in FIG. 3, a BTS 66 provides a link to mobile subscribers or (mobile stations) 10. Each BTS 66 typically may include two or more antennas 67, which may be omni antennas or directional antennas. Omni antenna configurations provide 360° of coverage, whereas directional antennas provide less than 360° of coverage across an area known as a sector. For example, there may be two, three or more sectors in a typical directional configuration such that each sector of a two sector configuration generally provides 180° of coverage and each sector of a three sector configuration generally provides 120° of coverage, etc. For satisfactory reception and transmission, each sector typically requires at least two antennas for diversity reception.

Continuing with the description of FIG. 3, each BTS 66 is coupled to a Base Station Controller (BSC) 70 (multiple BTSs 66 may be coupled to a single BSC 70). Likewise, each BSC 70 is coupled to a Mobile Switching Center (MSC) 72 and the MSC 72 is in turn coupled to a PSTN 68.

FIG. 4 (prior art) is a functional block diagram of a BTS. As shown in FIG. 4, a conventional BTS 66 typically comprises four major functional blocks for each sector of coverage: an RF front-end 74, a plurality of transceivers 76, a plurality of modem processors 78, and a controller 80. Controller 80 interfaces with a BSC 70 over a T1 or E1 line 81, and the RF front-end 74 is connected to the antennas 67 which are typically mounted at the top of a tower or pole 82 as represented in FIG. 5 (prior art), where FIG. 5 illustrates an outdoor and ground based BTS coupled to a tower topped mounted antenna.

In a typical system, the four major functional blocks of the BTS 66, shown in FIG. 4, are contained in one physical cabinet or housing which is in close proximity to a pole (or tower) 82 at ground level. Long coaxial cables 84 are then run to the top of the pole 82 where the antennas 67 are mounted. The cable length typically varies from 50 to 200 feet, depending on various installation scenarios. Cables of these lengths suffer from undesirable power losses. Accordingly, thick coaxial cable diameters of approximately ¾ to 1½ inches are used to minimize the cable power loss, which is typically about 2 to 4 dB. Minimizing these power losses is important because such losses in the cables degrade the receiver sensitivity and reduce transmission power.

FIG. 5 depicts a prior art BTS unit 66 connected via a long length of cable 84 to an antenna 67 at the top of a supporting structure 82. FIG. 6 (prior art) is a block diagram of yet another known BTS architecture where a tower top mounted RF front-end module consists of a Low Noise Amp (LNA) and a Power Amp (PA) 74 (hereinafter LNA/PA unit 74). The cable power loss in this architecture is not as critical as in the previous mentioned architecture because the power loss can be made up with additional amplification. However, there is still a need to use rather thick cables due to the signals between the LNA/PA unit 74 and the transceiver 76 in the BTS 66 are high frequency/radio-frequency (RF) signals. Other problems are associated with transmitted RF signals between the LNA/PA unit 74 and the BTS 66, such as power losses, system noise, and mechanical clutter. Furthermore additional complex circuitry either or both in the RF front-end module and the transceiver may be required to automatically compensate for the wide range of cable losses that arise in different installation scenarios due to varying cable lengths. Such problems get more severe as the operating RF Frequencies are allocated in the increasingly higher frequency bands. This is the case for personal communications systems.

In other words, as the length of a cable 84 increases, or as the frequency transmitted through a cable 84 increases, power losses between the LNA/PA unit 74 and the BTS 66 increase. Thus, the long cables 84 used to connect the LNA/PA unit 74 to the BTSs 66 (often in excess of 150 feet, sometimes even exceeding 300 feet) introduce large power losses. For example, a 100 W power amplifier in a base station transceiver unit transmits only 50 W of power at the antenna when there is a 3 dB loss in the cable. Power losses in the cable work against reception as well, reducing the ability of the receiver to detect received signals. Also, with Personal Communication Systems (PCS) operating at high frequencies, the power loss in the cable 84 running between the LNA/PA unit 74 and the transceiver 76 in the BTS 66 increases. Thus, RF cable losses incurred on both the transmit and receive paths result in poorer than desired transmission efficiency and lower than desired receiver sensitivity, making the use of relatively thick (high conductance) coaxial cables necessary to minimize loss.

Generally, in a wireless environment, wherein radio frequencies are transmitted through air, interferences are inevitable. That is, unless a transmitting antenna is directly in the line-of-site of the receiving antenna and no obstacles, such as trees, buildings, rock formations, water towers, etc., are in the way, then reflections will cause fading and multipath signals. In order to minimize the effects of fading and multipath, diversity receivers can be used increase the carrier-to-noise ratio (and/or Eb/No. A diversity receiver requires its own antenna. Thus, for each transmission frequency two antennas are used on the receiving side. One antenna is a transmit/receive antenna and the second antenna is used for a diversity receiver which is utilized to overcome some of the fading and multi-path problems.

In some cell sites, where the communication capacity is high, there is a need to transmit more than one RF carrier signal. The transmission of multiple RF carriers per sector requires a corresponding number of transmit antennas per sector. Additional receiving antennas are also required especially if diversity receivers are utilized in the system. Increasing the number of antennas creates an "eye-sore" for the public and is not desirable.

A conventional technique for reducing the number of transmit antennas required for multiple RF carrier transmission are shown in FIGS. 7 and 8.

In FIG. 7 (prior art) the carriers are combined with a high power combiner. In FIG. 8 (prior art) the carriers are combined at low power and then the combined signal is amplified with a multi-carrier power amplifier.

Neither design is suitable for use in a compact BTS system due to high power loss in the combiners and the inability to provide diversity reception.

What is needed is a compact BTS system that can be adapted to handle multiple transmit and receive frequencies, multiple sector configurations, multiple wireless communication protocols and be able to transmit signals at a variety of power levels for different types of cells (e.g. macro-, micro-, pico-), without increasing the number of antennas significantly or substantially decreasing the overall performance of the system.

SUMMARY OF THE INVENTION

The present invention provides a BTS wherein a radio unit (RU) is located proximate to the antenna mounting location. A main unit (MU) is connected to and remotely located from the RU. One or more antennas are coupled to the RU. There can be a plurality of RUs connected to a single MU. The plurality of RUs may operate on the same or different frequencies, the same or different transmit power, the same or different wireless communication protocols.

An exemplary embodiment of the present invention minimizes the number of antennas required for multiple frequency, multiple communication protocol, or variable transmit power BTS system.

Another exemplary BTS system allows for two RUs to be connected together to thereby increase the number of operating frequencies, or communication protocols, while maintaining transmission power level without increasing the number of antennas.

Another exemplary embodiment of the present invention is to increase call capacity of a BTS without increasing the number of antennas for a cell, thereby minimizing the cost of increasing the call capacity.

Another exemplary embodiment of the present invention transmits and receives two frequencies or wireless protocols with two antennas and maintains diversity reception. The diversity receiver helps to minimize the effect of fading and multipath.

There are many advantages to this exemplary architecture and some of them may be as follows:

A compact size RU is provided which can be easily mounted close to the antennas, whereby cable loss is virtually eliminated. Cable losses degrade the receiver sensitivity and reduce the transmit power. The present invention, thus, allows for a relatively low power PA and provides a transmit power level equivalent to a higher power PA used in a prior art BTS.

The inclusion of the transceiver in the RU allows for a lower frequency interface rather than an RF interface typically used in prior arts, to the MU. The lower frequency interfaces yield lower cable losses, thus allowing the use of inexpensive and small diameter interconnect cables between the RUs and the MU.

The separation of RF elements and dependent elements thereof, also, result in easier adaption of the BTS design to support different RF operating environments or conditions, as in different frequency bands and different transmission power levels, as only the RU needs to be modified, while the same MU is used. This also results in a compact size MU for ease of handling and mounting. This is because less space and weight are required without RF elements installed and, at the same time, less heat is generated in the MU requiring cooling.

This architectures allows a wireless communication provider to provide service via a variety of wireless protocols without the need for a different BTS for each protocol.

This architecture also allows the BTS to be configured to support either omni or sector operations, or to upgrade from omni to sector operations as the traffic demand goes up. This is especially important in CDMA systems where softer handoffs need to be supported between the sectors. For an omni configuration, only one RU is needed. For two or three sector configurations, two and three RUs are needed, respectively. The three RUs can be operated on the same frequency in a three sector configuration or at different frequencies in a three carrier omni configuration.

The present invention also allows the connectivity of another set of three RUs connected to its own MU to the same antennas without the use of a combiner.

By locating the transceiver module in the RU, only low frequency signals need be passed from the transceiver module and the MU. On the receive side, the transceiver module converts a high frequency signal to a low frequency signal, and on the transmit side, the transceiver module converts a low frequency signal from the MU to a high frequency signal for transmission. Thus, only low frequency signals are passed between the RU and MU, minimizing power loss in the cables connecting the two units. This results in the ability to use smaller diameter; less costly cables.

Another advantage to removing the transceiver subsystem from the MU is that the resulting MU is physically much smaller in size and weighs less. This translates into easier installation and maintenance, as well as into flexibility in meeting the technical demands of a challenging operating assignment or challenging environmental considerations. In addition, smaller size and lighter weight BTSs are especially advantageous for Pico-cell applications or micro-cell applications where a greater number of BTSs are required than are needed for macro cell implementations.

Since the entire transmit functionality is contained in the RU, the RU receives only a baseband signal for transmitted data and does all of the up-conversion and amplification at the RU. This eliminates the need for sending RF signals up to the RU, thus allowing the RU to operate at a higher efficiency than a unit in which the RF signal must travel the length of the pole.

Up-conversion is done in the RU, thus, direct modulation reduces the complexity of the transmit signal line, and provides a significant cost reduction over systems that run a transmit signal up the pole and then up-convert again to RF. Far less RF components are required in the present invention than in the prior art.

Output power calibration can be performed at the factory and the RU can be programmed for usage with any MU. The RU will store full-power settings, as well as reduced power settings, in local memory—thus enabling cell size adjustment from the RU, instead of at the BTS.

Wilting and blossoming attenuation can be accomplished in the RU rather than in the BTS. Also, output power detection is performed in the RU and, more important, can be used to verify the integrity of the entire signal transit path. Previously, in units where the PA is mounted on the pole, the output power attenuation could be detected, but the operator could not determine if the problem was in the PA module or the MU.

System upgrades can be accomplished more easily as entire RUs or MUs can be, replaced. In addition, because like elements are configured together, board or device level upgrades are also more easily accomplished than with traditional BTS units.

These and other advantages of the present invention will become apparent to one of ordinary skill in the art after consideration of the figures and detailed description which follows hereinafter.

BRIEF DESCRIPTION OF THE DRAWING

A more complete understanding of the method and to apparatus of the present invention may be had by reference to the following Detailed Description when taken in conjunction with the accompanying Drawings wherein.

DETAILED DESCRIPTION OF THE PRESENTLY PREFERRED EXEMPLARY EMBODIMENTS OF THE PRESENT INVENTION

In the description which follows, exemplary preferred embodiments of the invention are described for a Pico base station transceiver subsystem architecture. However, it will be understood that the present invention may be applied to any base station transceiver subsystem architecture in a wireless communication system, including, but not limited to, macro and micro base station transceiver subsystems.

Figure 9:
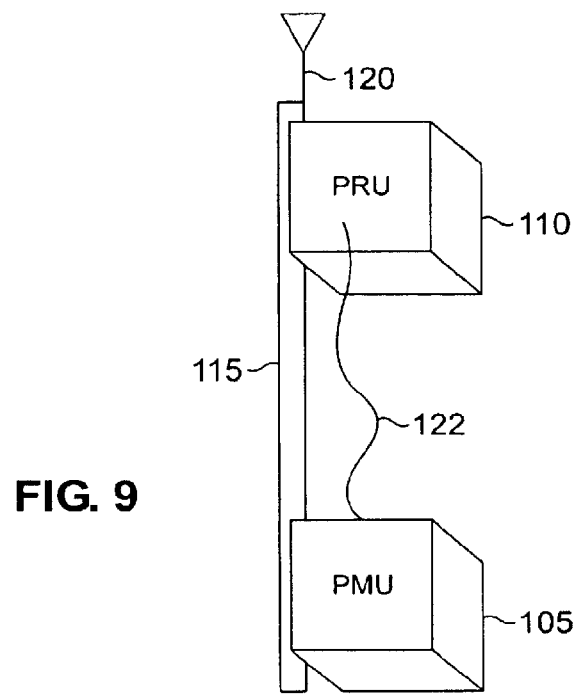
FIG. 9 illustrates a base station system according to an embodiment of the present invention coupled to a pole-mounted antenna.

FIG. 9 illustrates the basic idea underlying a base station transceiver subsystem (BTS) architecture according to an exemplary embodiment of the present invention—the BTS is separated into two units, the Pico-BTS Radio Unit 110 and the Pico-BTS Main Unit 105. In the exemplary system illustrated in FIG. 9, a Pico-BTS comprises the Pico-BTS architecture 100 which is divided into the Pico-BTS Main Unit ("Main Unit System," PMU, or MU) 105 which may be located, as shown, at the base of a pole, tower, or other support structure 115, and the Pico-BTS Radio Unit ("Radio Unit System," PRU or RU) 110, which transmits and receives signals through at least one pole-mounted antenna 120, and communicates with the PMU 105 via a plurality of wires 122 which may include a coax cable.

Figure 10:
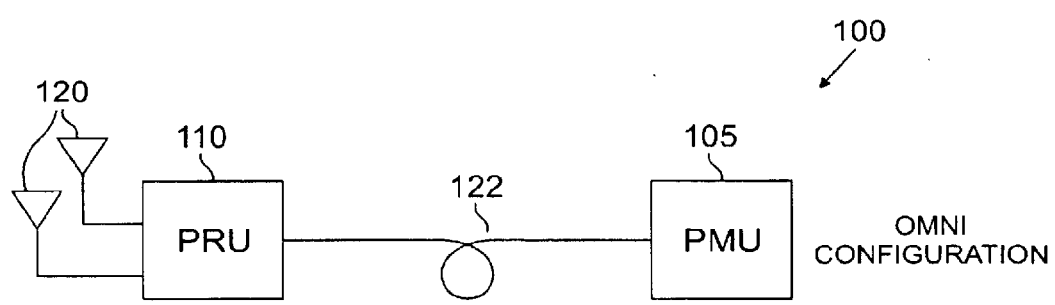
FIG. 10 is a block diagram illustrating a base station transceiver subsystem architecture according to an embodiment of the present invention for an omni configuration.

An embodiment of the present invention is illustrated in a high-level block diagram as an omni configuration in FIG. 10. PRU 110 can be distally connected to the PMU via the wires or cables 122. The distance or separation between the PRU 110 and the PMU 105 can be more than 350 feet (current systems are typically separated by about 150 feet). This is adequate since the PMU 105 is designed to be placed at the bottom of a tower building, pole or other supporting structure 115 and the PRU 110 is to be placed at the top near the antenna(s). To transmit and receive signals, the PRU 110 is shown coupled to one, but typically is coupled to at least two, tower top mounted antennas 120.

The wires or cables 122 can include optical cabling between the PMU 105 and the PRU 110. Optical cabling will increase the distance allowable between the PMU and RMU because an optical signal will be less lossy than an electric signal in, for example, la coaxial cable.

Figure 11:
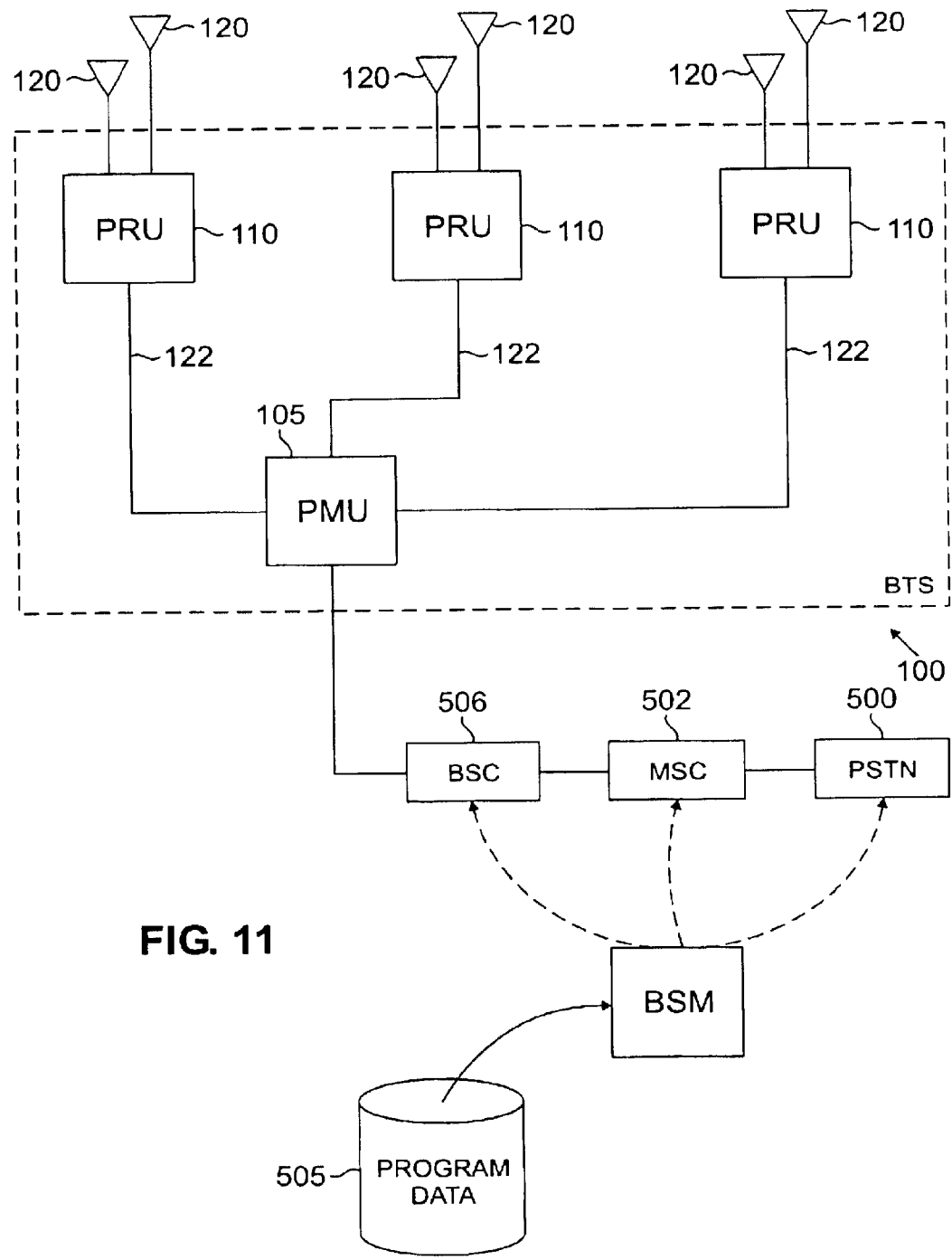
FIG. 11 is a block diagram illustrating a base station transceiver subsystem architecture according to an embodiment of the present invention for a three sector configuration.

FIG. 11 illustrates a BTS architecture according to an exemplary embodiment of the present invention for a three sector configuration. Note that the hardware systems which are required to be duplicated are only duplicated in the PRU 110. Thus, the PMU is capable of interfacing with 1, 2, 3 or potentially more PRU's.

Figure 12:
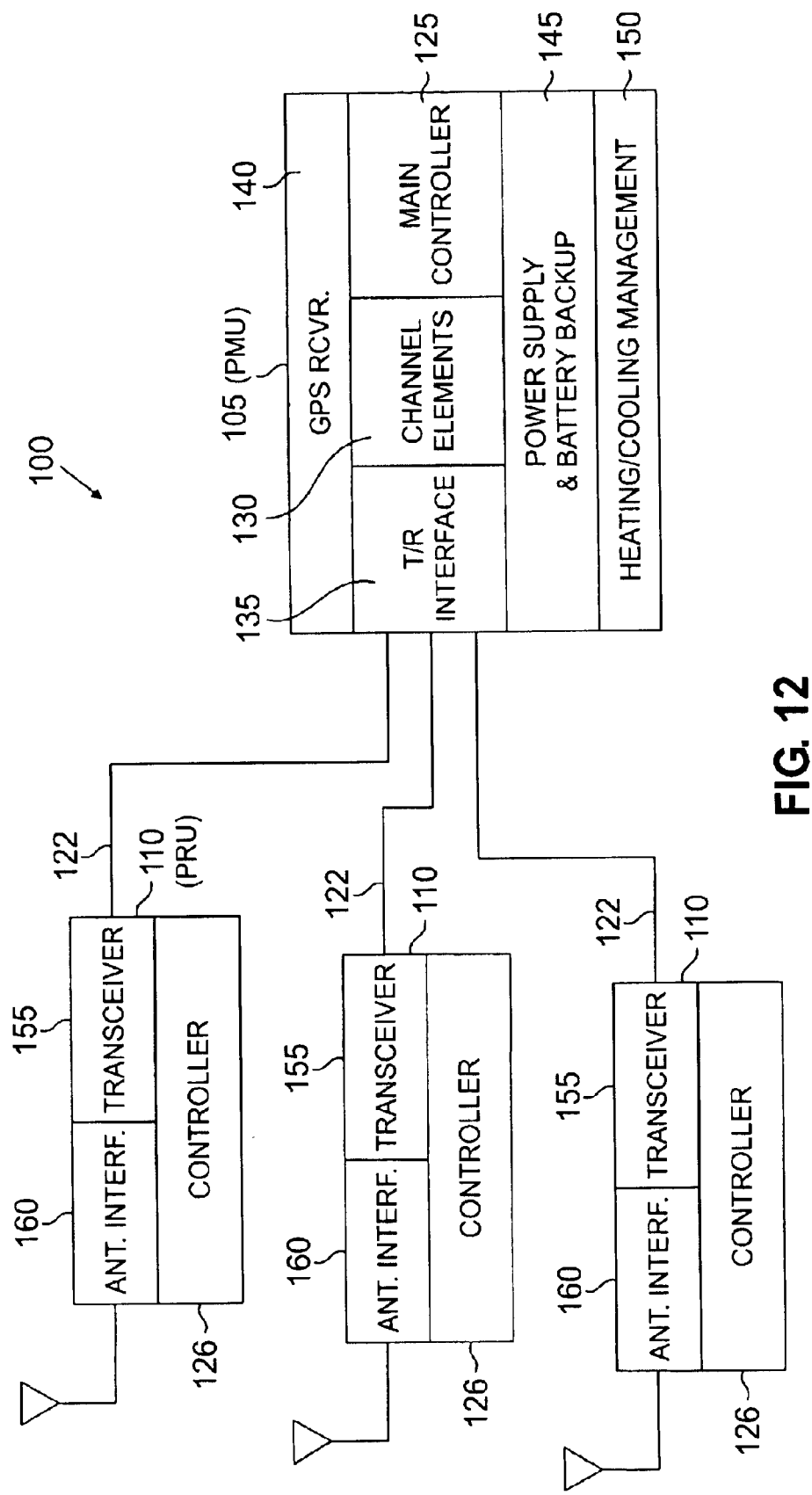
FIG. 12 is a functional block diagrams of a BTS architecture according to an embodiment of the present invention, with selected subsystems shown.

FIG. 12 is a block diagram illustrating exemplary elements of the PRU 110 and the PMU 105. As seen the PRU 110 is composed of transceiver module 155, which is couple to the antenna interface assembly 160. The antenna interface assembly 160 is coupled to the antennas 120. Controller circuitry 126 controls the antenna interface 160 and transceiver 155 portions of the PRU 110. The con roller circuitry can control the power output level of the antenna, the carrier frequency used to modulate the communication signal, or can support different control mechanism control mechanisms required by different communication protocols employed by the PRU 110.

The PRU 110 is coupled to the PMU 105 through a set of cables 122 which terminate in the PMU 105 at the Transmit and Receive interface 135 (T/R interface), which is coupled to the channel elements 130. The channel elements 130 are where a CDMA signal or other communication protocols is modulated and demodulated. There are a variety of protocols that could be supported by a single PMU and PRU combination. Such protocols include, but are not limited to CDMA, IS95 (A,B,C, etc.), Wide Band CDMA, IMT-200, CDMA2000, TDMA IS-136, GSM, AMPS analog, NAMPS analog, paging protocols, short message service protocols, and any other cellular or PCS protocols. The PMU 105 may also contain a global positioning receiver 140 which provides accurate clock and frequency signals to a main controller module 125, the channel elements 130, the T/R interface 135, and the PRU(s). Also within the PMU 105 is a power system 145, and a temperature control subsystem 150.

Figure 13:
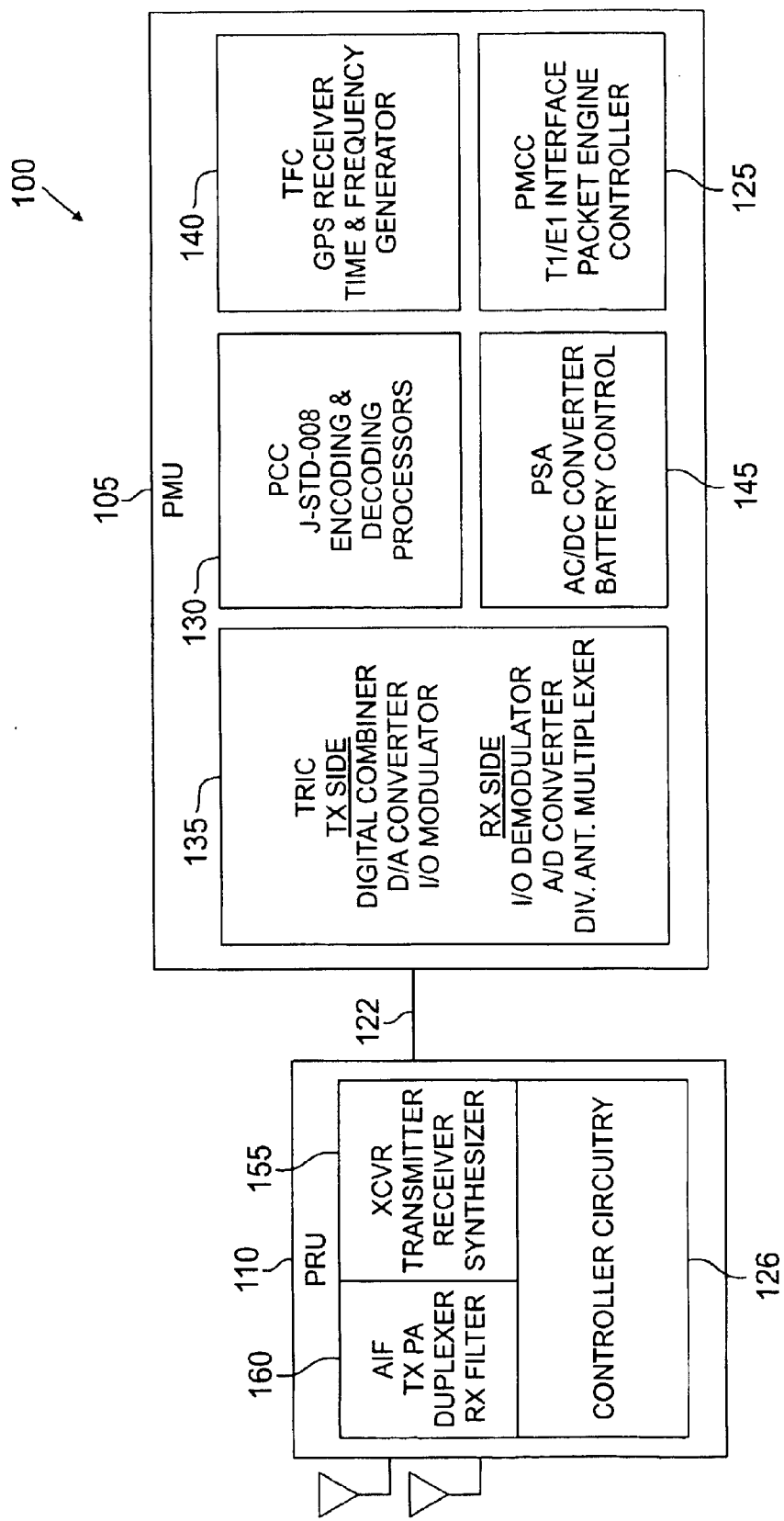
FIG. 13 is a modular level block diagram of an exemplary BTS.

FIG. 13 provides additional detail of the PRU 110 and PMU 105 subsystems. As shown in FIG. 13, each PRU 110 essentially comprises three modules: a transceiver module 155 (XCVR), antenna interface module 160 (AIF) and controller circuitry 126. These modules, however, can be combined into one or more than one module. Accordingly, the antenna interface module 160 may include a transmit power amplifier (PA) which amplifies the signal to a level required for desired cell coverage, two low-noise amplifiers (LNA-not shown) for amplifying received signals to maximize receiver sensitivity, a duplexer module for transmitting and receiving signals to and from a single antenna, and a receiver filter (Rx). The transceiver module 155 may include synthesizer circuitry, transmitter circuitry, and two receiver circuits (it is common to refer to a system's transmitter and receiver circuitry collectively as a "transceiver").

The PRU 110 also includes a controller portion 126 which includes a microprocessor and non-volatile memory to store calibration data and provide real-time temperature operating parameter compensation to the transceiver. Thus, a mobile station or mobile simulator is not needed for calibration, and system calibration in the field is also no longer needed. PRU 110 preferably houses the duplexer and the receive filter in a common cavity. This is essentially three filters (two receive and one transmit) combined into one metallic cavity. By combining the prior art duplexer cavity with the prior art diversity receive cavity, valuable space inside the unit may be used for other circuitry and cost is further reduced.

In the preferred exemplary embodiment, the duplexer/receiver filter cavity of PRU 110 is designed so that the connectors on the filter protrude directly through the cover of the unit, eliminating any coaxial cable bulkhead connectors. This approach requires fewer parts in the unit, again saving valuable space and reducing cost.

An embodiment of the present base station transceiver can provide a large amount of flexibility to the wireless service provider. First of all the transmit power amplifier found in the antenna interface portion 160 can be controlled by the controller circuitry 126 to output various predetermined amounts of power. For example, the transmitter power amp of the exemplary embodiment may be able to transmit at powers ranging from half a Watt to as high as 30 watts or more. Different PRUs, could be manufactured to provide varying amounts of transmitter power. One PRU may be designed to transmit from half Watt to 5 Watts. Another PRU may transmit from 1 to 10 Watts. Still yet another PRU embodiment may be able to transmit from 3 to 30 Watts. The amount of output power is controlled by the controlling circuitry 126.

The controlling circuitry may be communicated to via the cables 122 by the main unit 105. Thus, the output transmit power of the PRU 110 can be changed without physical servicing of the PRU 110. Instead a control signal can be sent to the PRU 110 to vary the transmit power. An advantage of being able to actively change the transmit power of a PRU are that the traffic carried by a network of base stations in a cellular style communication network can be balanced. In a downtown portion of a large city there may be a large density of customers in a relatively small area during daytime business hours, but may be a much smaller density of cellular customers in the evening or on weekends, the present exemplary PRU 110 can be set to balance traffic during weekday business hours by transmitting at a lower power to limit its range and pick up the high density of customers. In the evening or on weekends it can be reconfigured to transmit at a higher power to increase the PRU's range and pick up calls within the lower density of customers in the area.

Another way an exemplary embodiment of the present exemplary base station transceiver can provide additional flexibility to a service provider is by providing radio units that can be either programmed or hardwired to transmit and receive at different frequencies. Being able to transmit and receive at multiple frequencies is useful for many reasons. Each additional transmit and receive frequency increases the capacity of the BTS. Utilizing two frequencies doubles the capacity and utilizing three frequencies triples the capacity. Each PRU 110 that is in communication with a PMU 105 can be programmed or hardwired to transmit at a different frequency.

Furthermore, by operating at different frequencies, interference between sectors, adjacent cells and other wireless communication carriers can be minimized. Also, frequency interference between different protocols can be minimized.

The PRU 110 can also be designed to transmit and receive various different protocols. Furthermore, PRUs utilizing different protocols can all be connected to the same PMU 105. Such various protocols include, but are not limited to CDMA, Wide Band CDMA, CDMA2000, IMT-2000, TDMA, GSM, AMPS, NAMPS, Analog protocols, paging protocols, short message service protocols, and other digital protocols.

The PMU 105 may exercise a level of control over the PRU 110. That is, the PMU may be able to control the setting of the transmit power, the frequency, or the protocol that the PRU 110 utilizes. The PMU 105 receives a message via a wireless backbone network or other PSTN requiring a change in the characteristics of the PRU.

As discussed above, the PMU 105 may exercise a level of control over the PRU 110 by controlling a variety of variable or programmable aspects of the PRU 110. Referring to FIGS. 11 and 12, there are depicted two exemplary BTS systems 100 in accordance with controllable and programmable aspects of the invention. In the exemplary embodiments, software can be downloaded from the PMU 105 to the PRU 100 to control, for example, the radio frequency (RF) portion of the PRU 110. Preferably, when the PRU 110 is turned on, software is downloaded to it from the PMU 105. Furthermore, when the PRU 110 is on and operating, updates or changes in software or control of the PRU 110 can be downloaded from the PMU 105.

A craft, a person or operator at a Network Operations Center (not shown), can request, via a PSTN 500 or MSC 502, the version number of the radio unit software that is loaded into the PRU. The craft may then verify the loaded software version against the latest available software to check if the PRU requires a software upgrade.

The radio unit software, when installed in the PRU and PMU, can control a wide variety of functions performed by the PRU 110 and PMU 105. The radio unit software and data is downloaded from PMU 105 to the PRU each time the PRU is turned on. The radio unit software can also be upgraded, modified and downloaded to a PMU and PRU via a craft's instructions.

Although the specifics will be described in more detail below, the radio unit software can be utilized to set, among other things, the transmission frequency of each PRU 110. In the exemplary embodiment, the frequency can be selected from the range of A band through the F band of the CDMA frequency spectrum. It is understood that one of ordinary skill in the art could modify the invention to handle virtually any wireless communication frequency.

The exemplary radio unit software enables the PMU 105 to control and operate with a plurality of PRUs (three PRUs are shown) such that each PRU may operate at different frequencies, at the same frequencies, in a sector configuration, in a plurality of OMNI configurations, or any variation thereof.

Referring again to FIG. 11, a base station subsystem (BTS) 100 is connected to a Base Station Manager (BSM) 504 via a BSC, a MSC 502 or a PSTN 500. The exemplary BSM 504 holds the data bases and the software for downloading in a data storage device 505.

A craft, located at a network operation center, can "see" the configuration of at least large portions of a cellular phone system. The craft can reconfigure one or more BTS 100 units by turning them off (bringing them down), downloading new or changed radio unit software from the data storage device 505 to the BTS 100, resetting the BTS 100 and bringing the BTS 100 back on line (bring them back up).

When software or reconfiguration data is sent at the direction of the craft to an exemplary BTS 100, the PMU 105 first receives the software or reconfiguration data and then transmits the necessary information to the associated PRU 110 via, for example, a cable bundle 122.

In an exemplary BTS 100, after the PRU 110 is reset, the PMU will download appropriate radio unit software or data to the PRU 110. Once the appropriate radio unit software or data is downloaded to the PRU 110, the PRU 110 configures itself to operate in accordance with the loaded software or data.

Furthermore, while-the PRU 110 is "ON" and operational, information and commands can be sent between the PRU and PMU. For example, the PMU 105 may request the PRU 110 to provide receiver signal strength, temperature or other status information to the PMU for analysis or for delivery to the craft. In particular, the following commands can be sent from the PMU 105 to the PRU for the PRU to respond or reply to.

Performance Manager Commands

Start Collecting Receiver Signal Strength Indicator (RSSI) Information—With this command, the PMU 105 requests that the PRU 110 to begin collecting signal strength or RSSI information and to provide the collected information to the PMU 105.

Stop Collecting RSSI Information—Here the PMU 105 tells the PRU 110 to stop collecting signal strength or RSSI information.

Pico Performance Management Receiver Signal Strength Internal Time Out—With this command, the PMU can instruct the PRU to send RSSI information just once or at predetermined time intervals and/or for a predetermined amount of time.

Configuration Management Commands

Configuration Initiate—This exemplary command, sent by the PMU to the PRU, tells the PRU that a configuration or new configuration needs to be initiated.

Configuration Data—Configuration data is data that is sent from the PMU to the PRU to configure a plurality of 'settings' in the PRU. The configuration data comprises, among other things, the radio frequency channel number, the transmit power level setting and receiver signal strength settings.

The receiver signal strength settings may be used to help calibrate and set the transmit power of the PRU's transmitter (s). It is noted that as the PRU warms up, or is subjected to different operating temperatures, the actual transmitted power may drift from the set transmit power. Thus, the RSSI information can be used by the PMU to set the transmitter power of the PRU to compensate for a change of transmitted power due to temperature fluctuations. The receiver signal strength settings can be used to attenuate or amplify the transmission frequency. The attenuation value can also be used to effectively stop transmission of a transmitter. There can be other configuration settings or parameters provided with the configuration data as needed or required by the PRU.

Test Manager Commands

Receive Attenuation Control—This command from the PMU to the PRU requests that the receiver circuitry of the PRU be tested to determine whether the receiver signal path is working. In an exemplary embodiment, the PRU is placed into a self-test mode such that the receiver attenuation is varied and the RSSI information is provided to the PMU by the PRU.

Transmitter Power Level Request—Here, the PMU requests that the PRU provide the present transmit power setting. Even though the transmitter may be set at, for example, 5 watts, the transmit power will be incrementally different from 5 watts. The PMU decides, based on the set transmit power level and the RSSI information, if whether the PRU's transmitter circuitry is working via the radio unit software.

Voltage Standing Wave Ratio Level Request—This command is sent by the PMU to the PRU to request that the PRU calculate the standing wave ratio on a transmit or receive antenna. The standing wave ratio calculation will provide information indicating as to whether an antenna connected to a PRU is bent, broken or disconnected.

Power Control Request—This command is used by the PMU to request that the PRU indicate whether the transmitter/receiver circuitry power is on or off.

Fault Management Interface Query

Alarm Configuration Request—This request made by the PMU requests that an alarm configuration be initialized. Various predetermined operational ranges for the PRU alarms can be established. For example, the PRU can be set to provide an alarm signal to the PMU if the temperature of the PRU is outside a predetermined range, or if a predetermined circuit, such as a receiver, transmitter, or control card fails.

Alarm Status Request—This request by the PMU requests the status of each configured alarm setting in the PRU.

Fault Management Reset Request—This command sent by the PMU to the PRU requests the PRU to go through a reset. After this command is sent by the PMU, the PRU will have to be reconfigured. A new configuration will be sent to the PRU via the configuration command.

Download Version Request—With this command, the PMU can require the PRU to provide software version information for the presently operating software.

Fault Management Alarm Report

Alarm Report Acknowledgment—Here the PRU initiated an alarm report by providing an alarm signal to the PMU. The PMU replies to the PRU with an alarm report acknowledgment indicating that the PMU received the alarm report. For to example, the PRU may have determined that the transmitter temperature is too high. The PRU sent an alarm signal to the PMU indicating that the, transmitter temperature is outside of a predetermined range. The actual temperature reading may also be provided. In response thereto, the PMU will send an alarm report acknowledgment to the PRU.

The PRU may continue to send an alarm report to the PMU, for example, every five seconds until the PMU acknowledges that the alarm report was received.

Ping

Ping—The PMU sends a ping command to the PRU on a continuous interval basis. For example, a ping may be sent to the PRU every three seconds. Upon receiving each ping, the PRU must return a reply signal indicating acknowledgment of receipt of the ping. The ping is used to make sure that the data connection between the PMU and the PRU is operational and that the software in the PRU is not in a "run away" state.

In an exemplary BTS 100, if a ping is not acknowledged by the PRU three times in a row, then the PMU will shut down the PRU by first attempting to power down the transmitter(s) and second, power down the unit and reinitialize it.

Transmitter Power Level/Control

Transmit Attenuation Control—This command is sent to the PRU to control the amount of attenuation to apply to the transmit signal.

Transmit Power Control—This command is used to set the power output of the transmitter. In the preferred embodiments, the power output can be generally set at 1, 5 or 10 watts. These output powers are adjusted by the circuitry depending on temperature, antenna type, PRU configuration, etc.

Furthermore, it is understood that the PMU may be responding, in some cases, to commands sent from a craft via the BSC, MSC, BSM or PSTN. The craft may require the communication network to have different configurations based on the time of day (rush hour, non-rush hour), an emergency event, a holiday, increased usage due to area population increase, etc. The PRU may also be responding to commands generated, not by the craft, but by any number of automated programs which monitor a cellular communication network.

An exemplary BTS 100 in accordance with the present invention provides a means for configuring, programming and communicating commands to and with a radio unit (PRU) located to distally, but in communication with, a main unit (PMU) such that the BTS can be an integral programmable asset to a telecommunication system.

The PMU is responsible for the digital termination of a wireless protocol. That is, for example, the PMU handles the landline-to-CDMA or CDMA-to-landline conversion. On the other hand, the PRU receives baseband signals of the proper protocol from the PMU and modulates them to the appropriate radio frequency.

As illustrated in, FIGS. 12 and 13, the PMU 105 includes six functional subsystems: a Pico-BTS main controller card 125 (PMCC), a Pico-BTS channel card 130 (PCC), a transmit and receive interface card 135 (TRIC), a time and frequency card 140 (TFC), and a power supply assembly 145 (PSA) for converting AC to DC and for distributing the DC power throughout the PMU 105 and the PRU 110. The temperature management subsystem 150 is not shown in FIGS. 12 and 13 to simplify the Figures.

Figure 1:
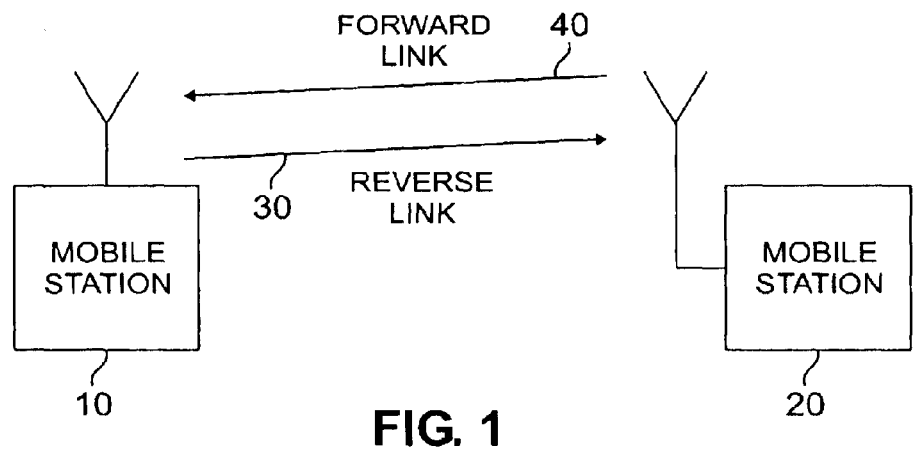
FIG. 1 (prior art) depicts a wireless communication system architecture.
Figure 2:
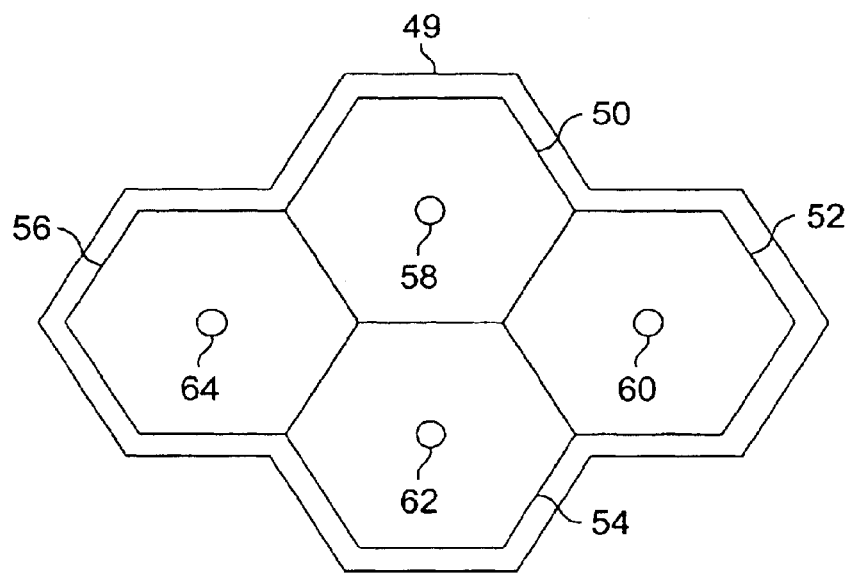
FIG. 2 (prior art) is a graphical representation of a cell grid and cell sites.
Figure 3:
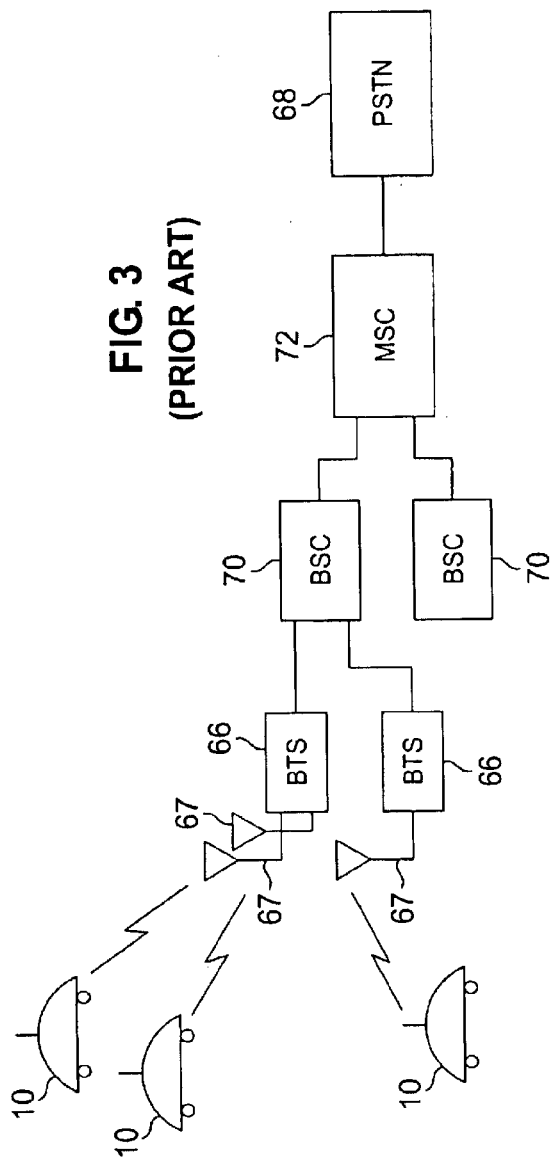
FIG. 3 (prior art) is a block diagram of a base station system (BTS) shown connected to a land-line PSTN.
Figure 4:
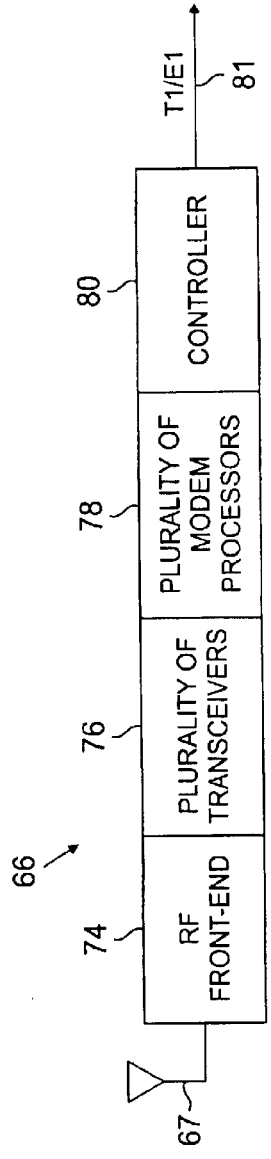
FIG. 4 (prior art) is a functional block diagram of a BTS.
Figure 5:
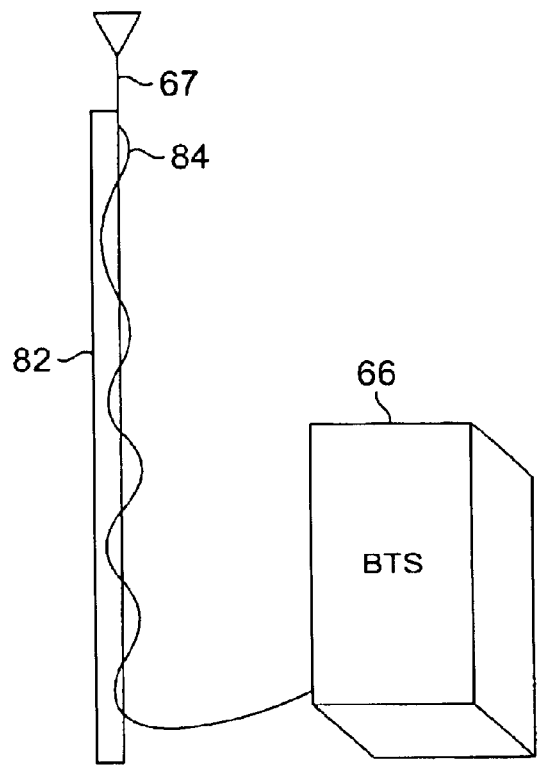
FIG. 5 (prior art) is an illustration of a ground based BTS coupled to a tower top mounted antenna.
Figure 6:
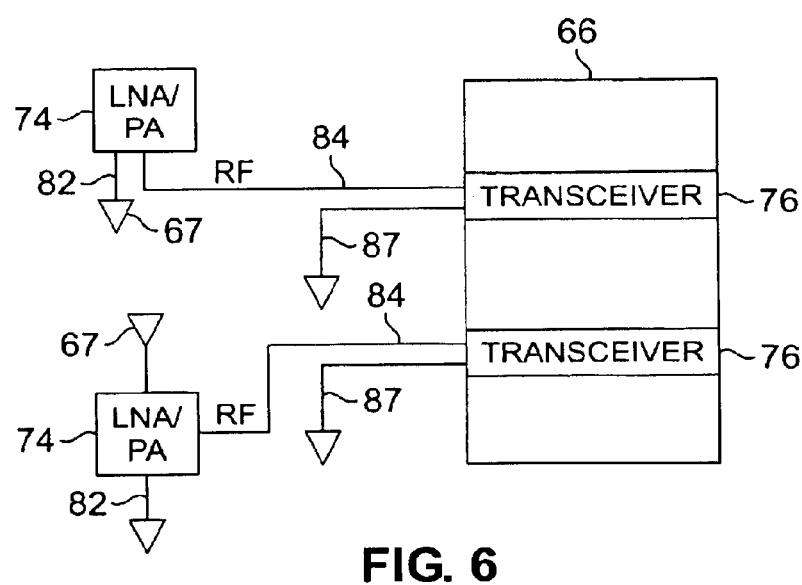
FIG. 6 (prior art) is a block diagram of a tower top configuration.
Figure 7:
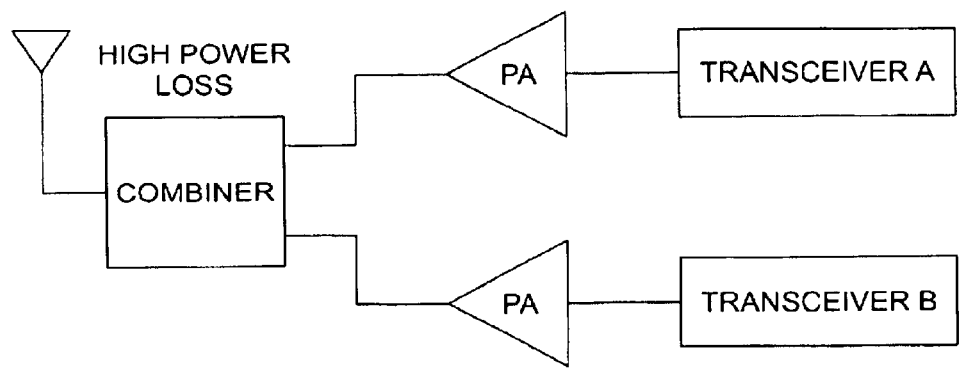
FIG. 7 (prior art) is a block diagram illustrating the combiner method for using one antenna to support multiple transceivers.
Figure 8:
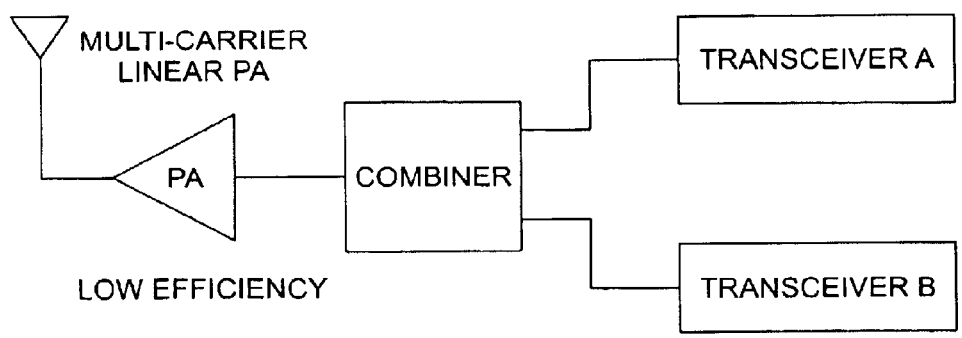
FIG. 8 (prior art) is a block diagrams illustrating the combiner/multi-carrier method for using one antenna to support multiple transceivers.

In operation, the PMCC 125, which includes an external interface module and a communications controller module, often called a packet engine, monitors all of the cards in the BTS architecture 100 and routes traffic and signaling packets between a Base Station Controller (BSC, see FIG. 3) shown) and the PCCs 130. Likewise, the TRIC 135 provides the interfaces between the transceiver module 155 and the PCCs 130. The PCCs 130 are responsible for converting landline communication information into the proper protocol baseband (such as CDMA) for transmission to a PRU 110 via a cable 122. The TRIC 135 provides the connectivity to the PRU 110 through interconnect cables 122.

Baseband analog signals and intermediate frequency (IF) signals of frequency range lower than that of the over-the-air radio frequency (RF) (e.g. of about 1 KHz to about 700 MHZ) are propagated in cables 122 connecting PMU 105 with PRU 110. One preferred IF frequency for the receive link is 239 MHZ with a 1.26 MHZ bandwidth and with an analog base band for the transmit link. The advantage of this approach is that the transmit and receive signals can be duplexed and sent through a standard, inexpensive RG-58 coaxial cable. Other signals to be carried between the units include 48V power, a 10 MHZ reference, and RS-422 control lines.

The separation of the PRU 110 and the PMU 105 allows the PRU 110 to be installed close to the antennas 120. Since in practice power losses in the antenna cable degrade receiver sensitivity and reduce the transmit power at a 1:1 ratio (dB per dB), locating the PRU 110 in close proximity to the antenna 120 maximizes the performance of the BTS 100. The location of the PRU also reduces power and signal losses through a cable and thereby may save energy and increase efficiency.

It is worth noting that all wires and coaxial cables may be bundled into a single polymer jacket. Thus, a single multiwire/coaxial connector is used at both ends of the cable. The resulting cable is typically built as a unitary item which provides easy of installation and repair in the field. Thus, the cable diameter may easily be kept under 0.75 inches, providing easy installation in the field, as well as in an indoor application (which require turning corners).

Coaxial cables coming into PRU 110 are transformer coupled to the transceiver, which eliminates the possibility of ground loops (and their corresponding ground noise), and ensures that the PRU 110 can be placed up to and in excess of 150 feet away from PMU 105. In addition, if the PRU 110 is connected to a pole or other conductive structure which is grounded, there will be no system performance degradation due to noise coupling. Power, at 24 or 48 VDC or an AC voltage, is sent to the tower top with a separate return. This provides less power loss in the power wires, making the system more efficient.

The signals carried by the cable 122 between PMU 105 and PRU 110 operate most efficiently over a range of about 1 KHz to 240 MHZ. This results in low signal attenuation, even when using thin, low cost cables.

In certain environments wherein heavy communication traffic is prevalent, it may be advantageous to connect two PRUs together and use two carrier frequencies. The exemplary embodiment can connect two PRUs together and transmit and receive two carrier frequencies with minimal degradation of signal quality and without increasing the number of antennas required. This is advantageous because the public is not subjected to additional potentially unsightly antenna yet acquires additional service from the PRU via an effective doubling of communication traffic capabilities.

Figure 14:
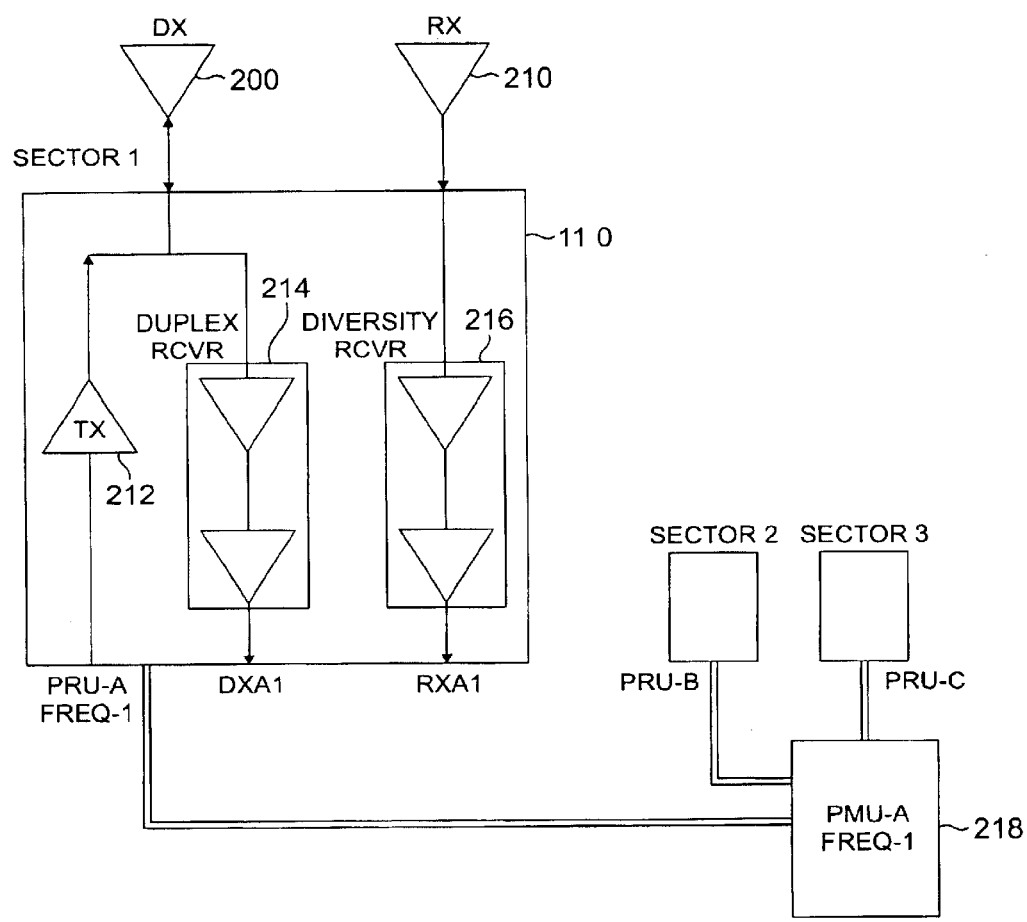
FIG. 14 depicts an exemplary block diagram of a single or multiple frequency, 3-sector embodiment of the present invention.

In order to simplify the disclosure, duplex and diversity channels for a single PRU are described for a single carrier frequency configuration in FIG. 14. It is understood that a PRU can be controlled to operate at different carrier frequencies, but a single carrier frequency at a time. In single carrier mode the service provider need only install one PRU for each sector. PRU-A 110 has two antennas: a duplex antenna (DX) 200 and a diversity antenna (RX) 210. The DX antenna 200 is shared by transmitter circuitry 212 and duplex receiver circuitry 214. The transmitter 212 transmits at an operating frequency T1. Both receivers DX and RX will down convert a received signal to received frequency R1. Preferably T1 and R1 frequencies have a frequency separation, which is dependant on the frequency band of form a frequency pair. The sector 2 and sector 3 PRUs are substantially the same as PRU-A 110. Note that the transmitter circuitry 212 and the duplex receiver circuitry 214 share the DX 200 antenna.

The diversity antenna 210 is in no way connected to the transmitter circuitry 212. Received signals come in the diversity antenna 210 and are provided to the diversity receiver 216. The duplex and diversity received signals are combined in the PMU 218 to improve the carrier to noise ratio (and/or Eb/No). This combining of signals helps negate the effects of fading and multipath found in the received signals.

The combination of PRU-A 110, PRU-B, and PRU-C cover three sectors or 360° about a cell tower. It is understood that a single PRU 110 could be used in an omnidirectional mode such that there would be two omni antennas, one for DX 200 and one for RX 210. FIG. 14 discloses an exemplary embodiment of the present invention that provides a PRU 110 for transmitting and receiving a communication signal and further have a diversity receiver which reduces degradation effects of fading and multi-path signals.

Figure 15:
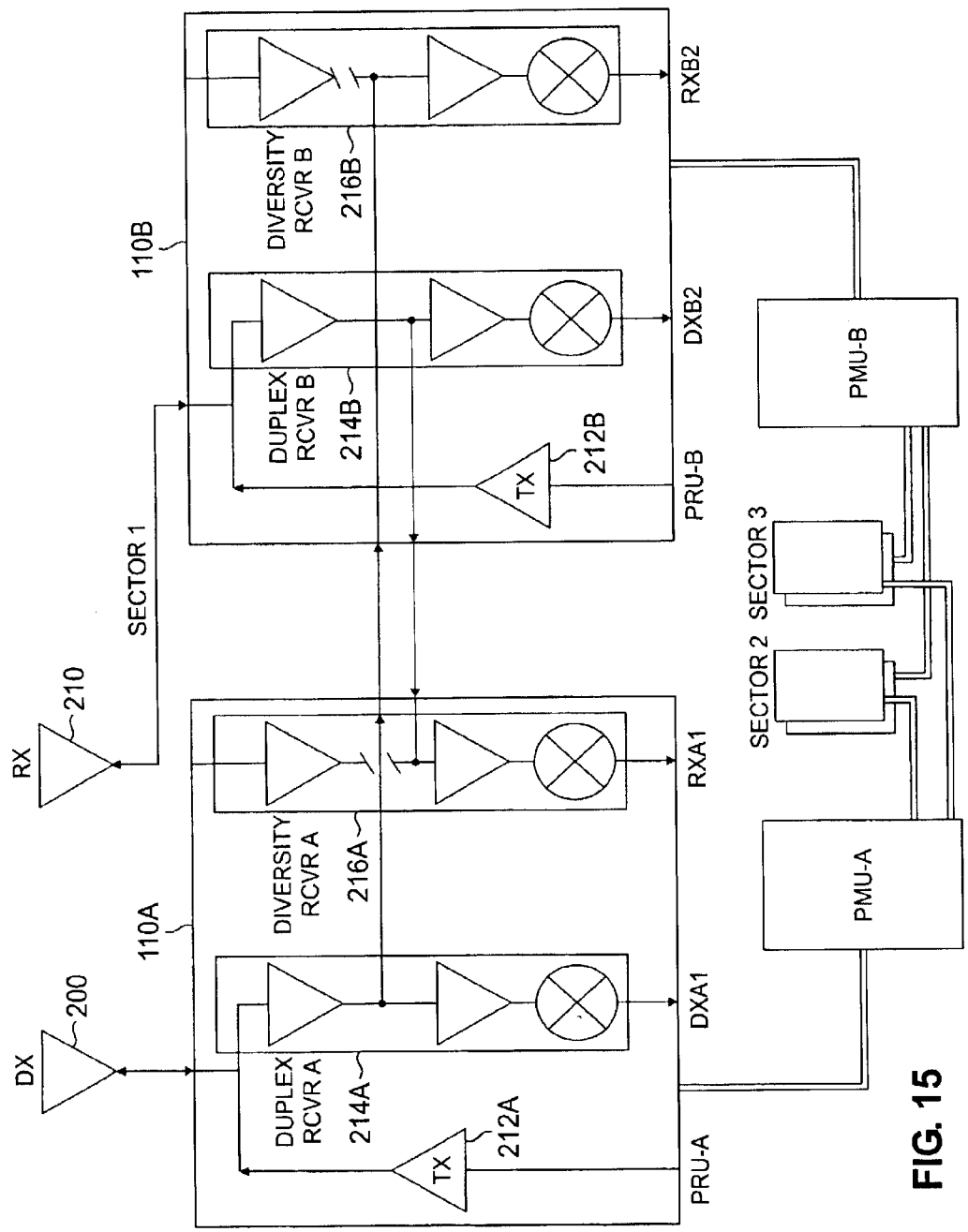
FIG. 15 depicts an exemplary block diagram of a dual frequency, 3-sector, antenna sharing embodiment of the present invention.

FIG. 15 depicts another exemplary embodiment of the present invention. Here an exemplary dual carrier frequency 3-sector configuration for a CDMA transmitter/receiver is shown wherein only two antennas are required and diversity reception is still maintained. It is understood that various protocols, or power levels can be supported as discussed above. The additional requirement for a dual carrier mode for each sector over a single carrier mode in each sector requires an additional PRU per sector and an additional PMU for the site location. No additional antennas are required.

The DX antenna 200 is shared by both transmitter circuitry 212A, the duplex receiver 214A in PRU-A 110A and the diversity receiver 216B in PRU-B 110B. The RX antenna 210 is shared by the transmitter 212B, the duplex receiver 214B found in PRU-B 110B and the diversity receiver 216A in PRU-A 110A.

Each signal after entering the duplex receiver (214A, 214B) is split by a power splitter (see FIG. 16) such that substantially half the signal is provided to the diversity receiver in the other PRU. More specifically, the signal to duplex receiver A 214A is split by a 3 dB power splitter. One output of the splitter is provided to the duplex receiver A 214A and the second output of the splitter is provided to diversity receiver B 216B found in PRU B 110B. The duplex receiver signal in PRU B 110B is split in the same fashion as that just described in PRU A 110A. PRU A 110A will operate at frequency pair #1 and PRU B will operate at frequency pair #2. The signal from the DX antenna 200 which is split and provided to duplex receiver A 214A is processed by the duplex receiver A 214A and becomes the duplex signal for frequency pair #1 (DXA1). The signal from the RX antenna which is provided to PRU B 110B is split in the duplex receiver B 214B and provided to the diversity receiver A 216A of PRU A 110A. Thus, the signals processed in duplex receiver A 214A and diversity receiver A 216A are substantially the same as those found in the single carrier mode, where the DX antenna 200 provides signal to the duplex receiver A 214A and the RX antenna 210 provides a signal to the diversity receiver 216A. Thus, the outputs DXA1 and RXA1 and the signal being transmitted by transmitter A 212A are to all associated with the same frequency pair #1. RXA1 is the diversity signal associated with DXA1.

With respect to PRU B 110B, it utilizes the RX antenna 210 for transmitting the transmit signal for frequency pair #2 via transmitter B 212B. Furthermore, a signal received from the RX antenna is split such that 3 dB of the signal is provided to the duplex receiver B 214B and 3 dB of the signal is provided to diversity receiver A 216A. Thus, separate antennas are being utilized for the received duplex and diversity receivers. Furthermore, the second frequency pair is being transmitted and received by PRU B 110B. Output signals RXB2 and DXB2 can be provided to PMU B via the associated cable as the diversity and duplex signals.

Receive diversity is maintained as both PRUs (A&B) provide independent receive signals back to their respective PMUs. The advantage with this exemplary configuration in that capacity is doubled as there are now two frequencies being utilized. Most importantly, the doubling of capacity is accomplished without installing additional antennas. Further, no hardware reconfiguration is required inside the PRUs. An additional advantage is the savings in nonrecurring engineering costs and set-up costs due to the expansion to ability provided by this exemplary embodiment. Minor exterior cabling modifications may be required to the PRUs to achieve the dual carrier configuration. Note that sectors 2 and 3 can be configured in a similar fashion as sector 1 in this embodiment.

Figure 16:
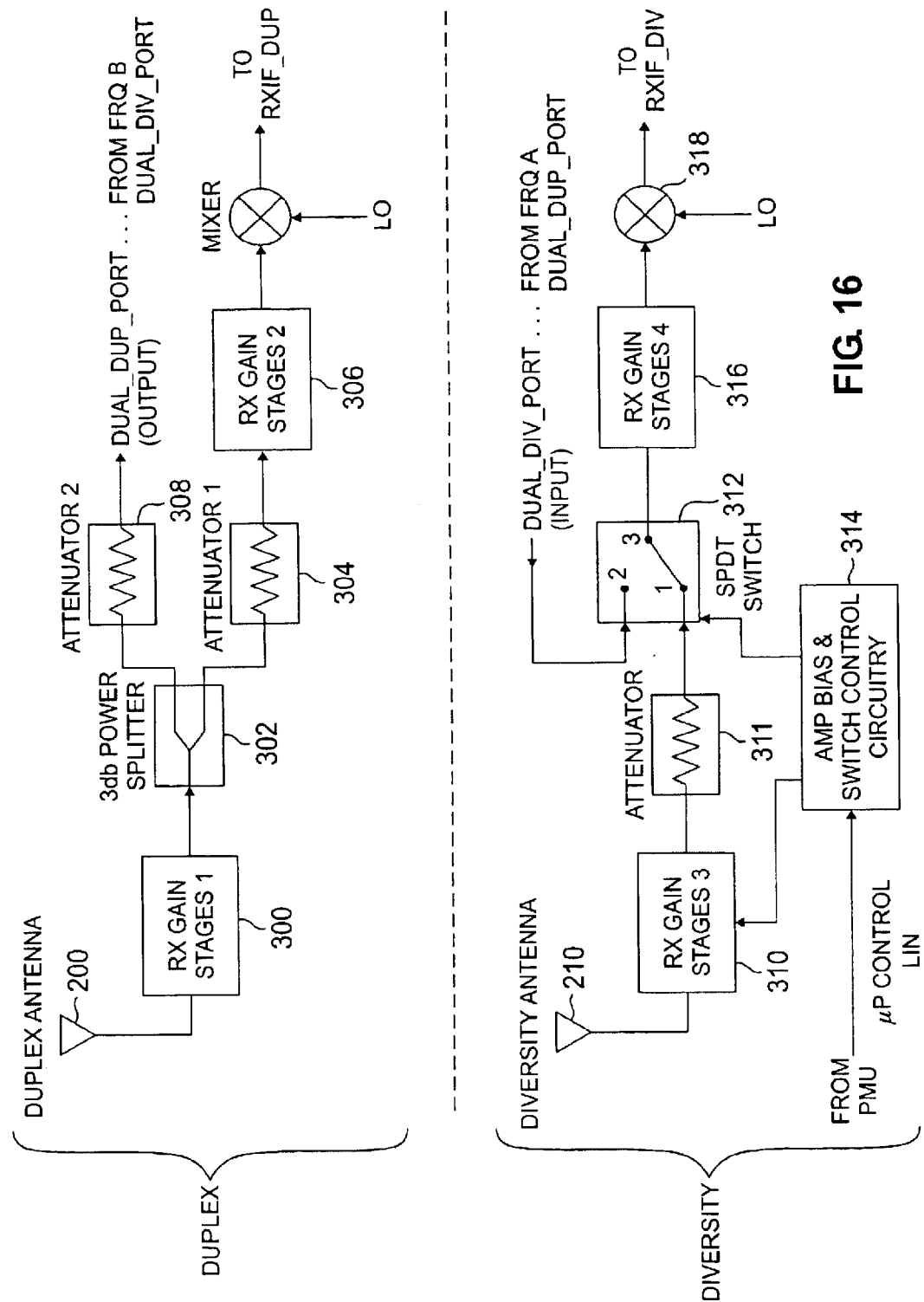
FIG. 16 depicts a block schematic of the duplex and diversity receiving channels of an exemplary PRU.
Figure 17A:
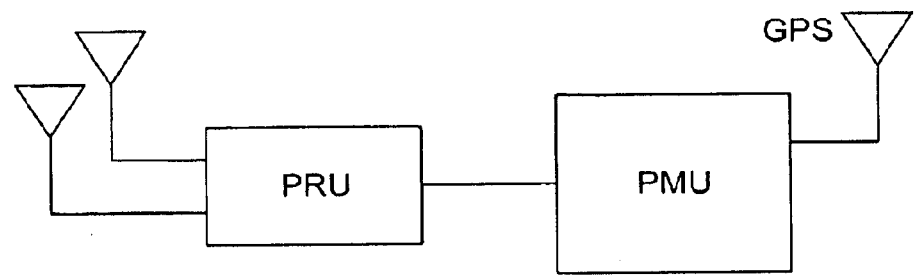
FIGS. 17(a–e) depicts a plurality of exemplary embodiment configurations of the present invention.
Figure 17B:
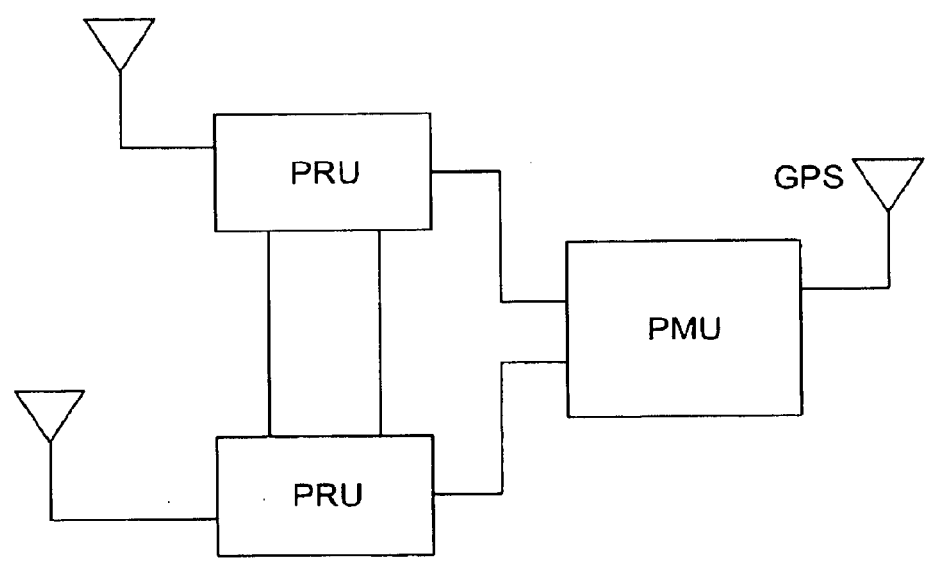
Figure 17C:
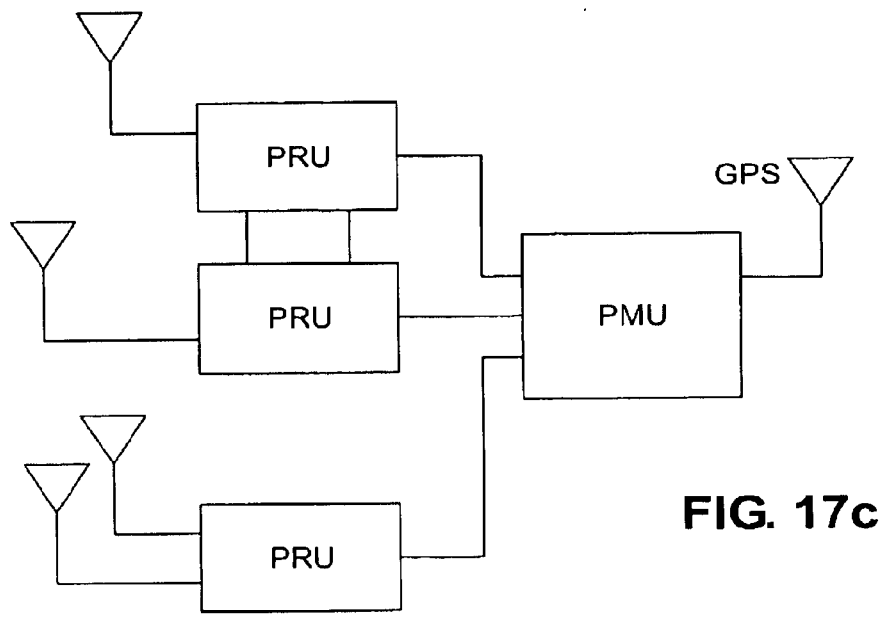
Figure 17D:
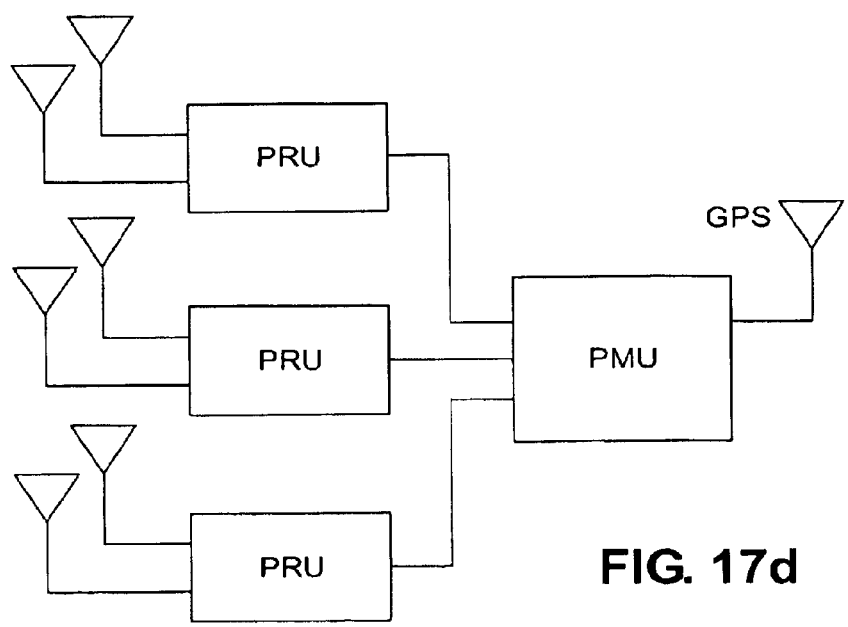
Figure 17E:
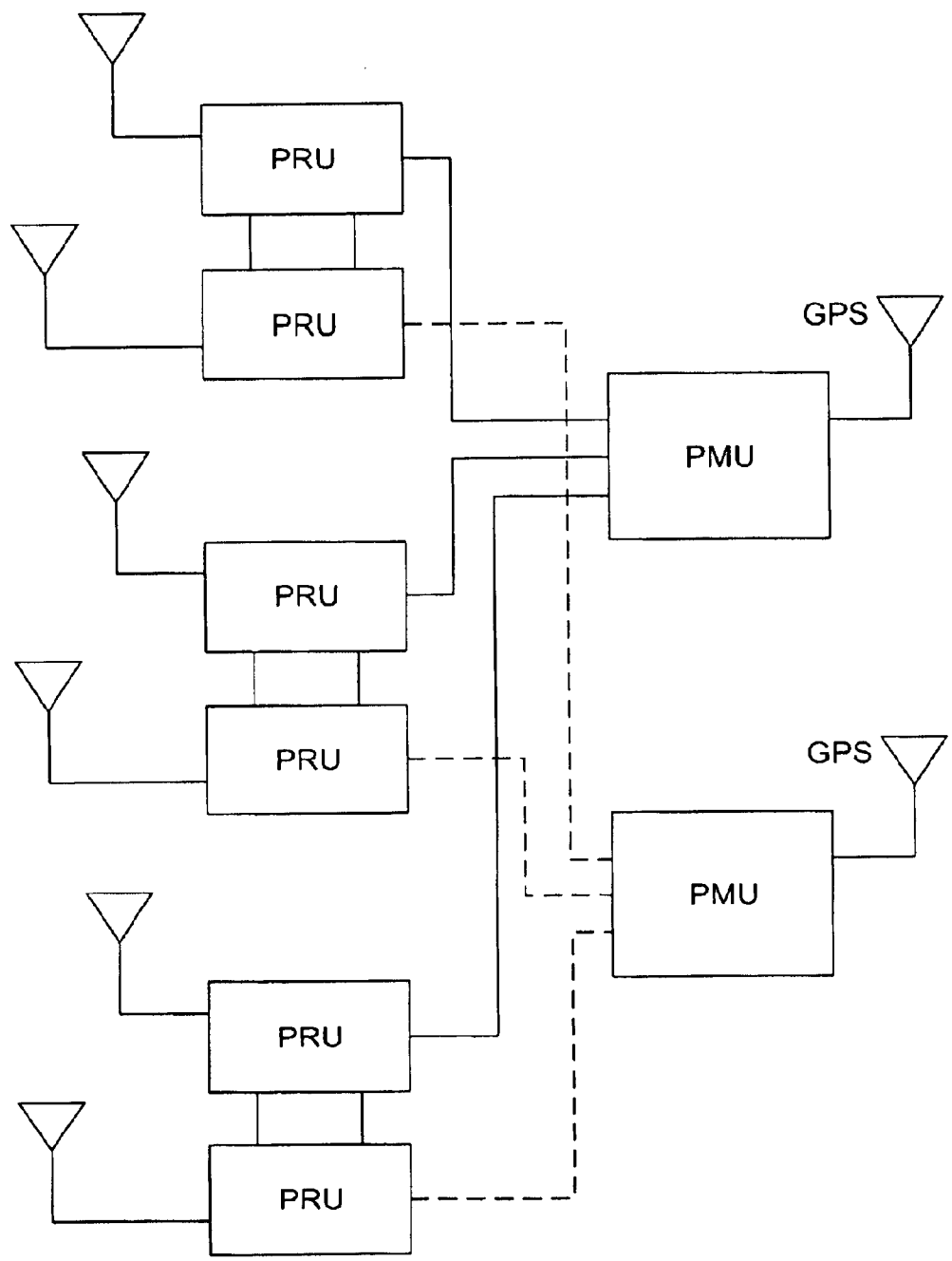

FIG. 16 is a high level schematic representation of the duplex and diversity receiver channels. One can discern from FIG. 16 that these receivers can be configured for either a single or dual carrier frequency configuration. It is understood that FIG. 16 does not include all the circuitry required, but instead is a schematic block diagram that discloses the fundamentals of an exemplary embodiment of the present invention understandable by one of ordinary skill in the art.

FIG. 16 is divided into a duplex receiver portion and a diversity receiver portion which are found within an exemplary PRU 110. Looking at the duplex portion of the drawing, the duplex antenna 200 receives a signal and provides it to a receiver gain stage 300. The signal is then provided to an RF splitter 302. The RF splitter is preferably a 3 dB power splitter. A portion of the signal proceeds to attenuator 1 304 and then to another receiver gain stage 306. The signal output from the receiver gain stage 306 is then downconverted and provided as the received duplex signal (RxIF_DUP).

If the PRU is set up for a dual carrier wherein two PRU are in use, a portion of the signal is output from the RF splitter 302 to an attenuator 308, the output of which would be provided as an input to the other PRU.

Referring to the diversity portion of exemplary PRU in FIG. 16, when the PRU is configured for single carrier frequency processing, an RF signal is received by the diversity antenna and provided to a receive gain stages section 310. The signal is then provided to an attenuator 311 and then to a single pole double throw (SPDT) switch 312. The SPDT switch 312 is controlled by amplifier bias and switch control circuitry 314 which in turn is controlled by the associated PMU.

When the SPDT switch 314 is in position "1" the signal is sent, in essence, from the diversity antenna 210 through the SPDT switch 312 and to another gain stage portion 316. The signal is then sent, via a mixer 318, to IF circuitry in the diversity receiver portion in the PRU and then finally to the PMU.

Conversely, if the exemplary PRU is in a dual carrier frequency mode, the diversity antenna 210, gain stage 310, and attenuator 311 are not used. Instead the diversity signal is received from the other PRU unit. (See FIG. 15) The signal is received at the SPDT switch 312 on pole 2 and then provided to the gain stage 316, the mixer 318 and finally provided to the appropriate PMU (as RXIF_DIV).

FIGS. 17(*a–e*) depict a plurality of exemplary embodiment configurations for the present invention. FIG. 17(*a*) is an omni mode, single frequency configuration setup with a diversity antenna. The PRU has two antennas one for duplex and one for diversity. The PRU is connected to the PMU. The PMU may have, a global positioning system (GPS) antenna connected to it.

FIG. 17(*b*) depicts an omni setup or single sector setup with two PRUs such that the system is operating with two carrier frequencies with two antennas one for diversity and the other for duplex. The PMU here can be either two PMUs or one PMU that handles two frequencies.

FIG. 17(*c*) depicts an omni, three carrier system with diversity that requires only four antennas. FIG. 17(*d*) depicts a three-sector, single frequency system with no antenna sharing. This system maintains both duplex and diversity reception for each sector.

FIG. 17(*e*) depicts an omni, six-carrier frequency system with antenna sharing. Thus, six carrier frequencies are handled with diversity reception with six receive/transmit antennas.

Thus, the exemplary embodiments disclose a PRU device that can be connected to handle one or two carrier frequencies without increasing antenna requirements. The present invention allows a service provider to upgrade a cellular (PCS) communication system from a single to a dual carrier frequency by only requiring the addition of a PRU and a cabling change. No new antenna(s) needs to be installed on a tower. No changes in technology or re-engineering cost are required. The result is twice the cellular (PCS) communication capacity without the addition of unsightly antennas. Basically a service provider buys another PRU, hangs the PRU on the existing antenna tower, then recables the external cabling to achieve double the communication capacity. This is a major advancement in cellular (PCS) technology and upgradability.

While the invention has been particularly shown and described with reference to specific embodiments thereof, it will be understood by those skilled in the art that various changes in form and detail may be made thereto, and that other embodiments of the present invention, beyond embodiments specifically described herein, may be made or practiced without departing from the spirit and scope of the present invention as limited solely by the appended claims.

What is claimed is:

1. A base station transceiver system divided such that a main unit is positioned distally from at least one radio unit, said base station transceiver system comprising:
    a first radio unit comprising;
        a first variable power amplifier for providing amplified transmit signals to a first antenna;
        a first transceiver circuitry connected to said first variable power amplifier; and
        a first controller circuit electrically connected to said first transceiver circuitry and to said first variable power amplifier;
    a main unit being for connecting said base station transceiver to a land line telecommunication system and for providing one of an intermediate frequency and base band telecommunication signals to said first radio unit, said main unit comprising a controller circuit for downloading a radio unit software to said first radio unit to be reconfigured in response to control signals received from said land line telecommunication system by said main unit.

2. The base station transceiver system of claim 1, wherein said at least one predetermined aspect of said first radio unit is a configuration aspect.

3. The base station transceiver system of claim 1, wherein said at least one predetermined aspect of said first radio unit is an alarm configuration aspect.

4. The base station transceiver system of claim 1, wherein said at least one predetermined aspect of said first radio unit is at least one of a transmit attenuation control and a transmit power control configuration aspect.

5. The base station transceiver system of claim 1, wherein said at least one predetermined aspect of said first radio unit is setting the transmit power of said variable power amplifier to one of a plurality of power settings.

6. The base station transceiver system of claim 1, further comprising:
    a second radio unit comprising:
        a second variable power amplifier for providing amplified transmit signals to a second antenna;
        a second transceiver circuitry connected to said second variable power amplifier; and
        a second controller circuit electrically connected to said second transceiver circuitry and to said second variable power amplifier, said main unit providing base band telecommunication signals to said second radio unit and providing control signals to said second radio unit, said controller circuit further for downloading said radio unit software to said second radio unit, said second radio unit being configured by said radio unit software such that said second radio unit is configured differently than said first radio unit.

7. A base station transceiver system for a wireless telecommunication system, said base station transceiver system comprising:

a main unit;

a first radio unit in communication with and distally located from said main unit, and a second radio unit in communication with and distally located from said main unit, said main unit comprising a controller circuit for downloading a radio unit software to at least one of said first radio unit and said second radio unit to be reprogrammed in response to control signals received from a network operating center by said main unit.

8. The base station transceiver system for a wireless telecommunication system of claim 7, wherein said first radio unit and said second radio unit can be reprogrammed to operate differently from each other.

9. The base station transceiver system for a wireless telecommunication system of claim 7, wherein said main unit can request predetermined status information from either said first radio unit and said second radio unit.

10. The base station transceiver system for a wireless telecommunication system of claim 9, wherein said main unit is adapted to forward said predetermined status information to said network operating center.

11. The base station transceiver system for a wireless telecommunication system of claim 7, wherein a first command can be sent from said main unit to said first radio unit such that said first radio unit responds to said first command by changing an operational aspect of said radio unit.

12. The base station transceiver system for a wireless telecommunication system of claim 7, wherein a first command can be sent from said main unit to said first radio unit such that said first radio unit responds to said first command by providing a status information to said main unit.

13. A remotely programmable base station transceiver system for a wireless telecommunication system, said remotely programmable base station transceiver system comprising:

an operations control center;

a base station communication transceiver in communication with said operations control center, said base station communication transceiver comprising:

a main unit adapted to receive commands and radio unit software from said operations control center; and a first radio unit, distally located from and in communication with said main unit, adapted to be configured with said radio unit software, said radio unit being for transmitting and receiving wireless telecommunication signals with a wireless communication network, said operations control center being able to set transmit variables of said radio unit via said main unit.

14. The remotely programmable base station transceiver system for a wireless telecommunication system of claim 13, wherein said operations control center can further request status information from said radio unit.

15. The remotely programmable base station transceiver system for a wireless telecommunication system of claim 14, wherein said status information includes at least one of an alarm status, a temperature status, a receiver signal strength information, a software version status, and a transmit power level request.

16. The remotely programmable base station transceiver system for a wireless telecommunication system of claim 13, wherein said transmit variable includes at least one of transmit power, transmit attenuation, transmit frequency, and radio unit alarm function settings.

17. A method of upgrading a base station transceiver system divided such that a main unit is positioned distally from at least one radio unit, the method comprising the steps of:

providing one of an intermediate frequency and base band telecommunication signals from the main unit to at least one radio unit;

downloading a radio unit software from the main unit to the at least one radio unit; and in response to receipt of control signals received from the main unit, reconfiguring at least one predetermined aspect of the first radio unit.

18. The method of upgrading a base station transceiver system as set forth in claim 17 wherein the step of reconfiguring is further performed in response to control signals received from a land line telecommunication system by the main unit.

19. The method of upgrading a base station transceiver system as set forth in claim 17 wherein the at least one predetermined aspect of the first radio unit is a configuration aspect.

20. The method of upgrading a base station transceiver system as set forth in claim 17 wherein the at least one predetermined aspect of the first radio unit is an alarm configuration aspect.

21. The method of upgrading a base station transceiver system as set forth in claim 17 wherein the at least one predetermined aspect of the first radio unit is at least one of a transmit attenuation control configuration aspect and a transmit power control configuration aspect.

22. The method of upgrading a base station transceiver system as set forth in claim 17 wherein the at least one predetermined aspect of the first radio unit is setting the transmit power of a variable power amplifier to one of a plurality of settings.

* * * * *

UNITED STATES PATENT AND TRADEMARK OFFICE
CERTIFICATE OF CORRECTION

PATENT NO. : 6,801,788 B1
APPLICATION NO. : 09/379551
DATED : October 5, 2004
INVENTOR(S) : John S. Csapo et al.

It is certified that error appears in the above-identified patent and that said Letters Patent is hereby corrected as shown below:

Column 1, line 40, delete "," after the term "coverage";

Column 5, line 35, delete "to" after the term "and";

Column 7, line 5, delete "con roller" and replace with --controller--;

Column 7, line 8, delete "control mechanism" after the term "different";

Column 11, line 31, delete "to" before the term "example";

Column 12, line 14, delete "to" after the term "located";

Column 13, line 3, delete "easy" and replace with --ease--.

Signed and Sealed this

Sixteenth Day of September, 2008

JON W. DUDAS
*Director of the United States Patent and Trademark Office*